United States Patent
Seolas et al.

(10) Patent No.: US 10,210,001 B2
(45) Date of Patent: Feb. 19, 2019

(54) AUTOMATIC EXECUTION OF OBJECTS IN A USER INTERFACE

(71) Applicant: OBSERVEPOINT, INC., Provo, UT (US)

(72) Inventors: Robert K. Seolas, Alpine, UT (US); John Raymond Pestana, Orem, UT (US); Tyler Broadbent, Lehi, UT (US); Gregory Larson, Orem, UT (US)

(73) Assignee: ObservePoint, Inc., Provo, UT (US)

( * ) Notice: Subject to any disclaimer, the term of this patent is extended or adjusted under 35 U.S.C. 154(b) by 437 days.

(21) Appl. No.: 14/914,590

(22) PCT Filed: Nov. 4, 2015

(86) PCT No.: PCT/US2015/059064
§ 371 (c)(1),
(2) Date: Feb. 25, 2016

(87) PCT Pub. No.: WO2017/078705
PCT Pub. Date: May 11, 2017

(65) Prior Publication Data
US 2017/0255475 A1    Sep. 7, 2017

(51) Int. Cl.
*G06F 9/451*    (2018.01)
*G06F 17/22*    (2006.01)
(Continued)

(52) U.S. Cl.
CPC ............ *G06F 9/451* (2018.02); *G06F 3/0482* (2013.01); *G06F 17/2247* (2013.01); *H04L 67/02* (2013.01)

(58) Field of Classification Search
CPC ....................................................... G06F 9/451
(Continued)

(56) References Cited

U.S. PATENT DOCUMENTS 6,470,383 B1 * 10/2002 Leshem ................. G06F 11/32
                                                        707/E17.116
7,502,994 B2    3/2009 Kocol
(Continued)

FOREIGN PATENT DOCUMENTS

KR    1020150079867    7/2015
WO    2004079551    9/2004
(Continued)

OTHER PUBLICATIONS

International Search Report for application No. PCT/US2015/059064 dated Aug. 4, 2016.
(Continued)

*Primary Examiner* — Reza Nabi
(74) *Attorney, Agent, or Firm* — Workman Nydegger

(57) ABSTRACT

Embodiments are directed to traversing and mapping a user interface. In one scenario, a computer system performs a method for traversing and mapping a user interface that includes the following: rendering a user interface (UI) based on data received from an information source, constructing an element collection with UI elements, the element collection describing relationships that exist between the UI elements, traversing the element collection to identify various node element types, identifying, within a pre-defined action set, an action associated with at least one of the identified node element types, executing the identified action against the identified node element types, and logging at least one network request resulting from the executed action.

17 Claims, 5 Drawing Sheets

(51) Int. Cl.
*G06F 3/0482* (2013.01)
*H04L 29/08* (2006.01)
(58) Field of Classification Search
USPC .......................................................... 715/704
See application file for complete search history.

(56) References Cited

U.S. PATENT DOCUMENTS

| | | | |
|---|---|---|---|
| 8,239,820 | B1 | 8/2012 | White et al. |
| 8,955,149 | B1 | 2/2015 | Baer et al. |
| 9,357,366 | B2 | 5/2016 | Seolas |
| 9,690,764 | B1* | 6/2017 | Batni ................... G06F 17/227 |
| 9,842,133 | B2 | 12/2017 | Seolas |
| 2003/0217191 | A1 | 11/2003 | Gao |
| 2006/0107306 | A1 | 5/2006 | Thirumalai et al. |
| 2006/0167717 | A1 | 7/2006 | Desenberg |
| 2007/0239726 | A1 | 10/2007 | Weiss et al. |
| 2008/0104542 | A1 | 5/2008 | Cohen et al. |
| 2009/0150262 | A1* | 6/2009 | Mizhen ................. G06Q 20/12 705/26.1 |
| 2009/0327858 | A1* | 12/2009 | Tsun ..................... G06Q 30/02 715/234 |
| 2010/0138437 | A1* | 6/2010 | Nadig ................ G06F 17/3089 707/759 |
| 2011/0035486 | A1 | 2/2011 | Seolas |
| 2011/0153796 | A1 | 6/2011 | Branson |
| 2011/0161922 | A1 | 6/2011 | Gerken |
| 2011/0185016 | A1 | 7/2011 | Kandasamy et al. |
| 2011/0302510 | A1* | 12/2011 | Harrison ........... G06F 17/30899 715/760 |
| 2012/0066583 | A1* | 3/2012 | Priestley ................. G06F 9/542 715/234 |
| 2013/0066724 | A1 | 3/2013 | Evans |
| 2013/0174047 | A1* | 7/2013 | Sivakumar ............. G06F 9/451 715/746 |
| 2013/0332277 | A1* | 12/2013 | Faith .................. G06Q 30/0239 705/14.54 |
| 2013/0337789 | A1* | 12/2013 | Johnson .................. H04W 4/02 455/414.1 |
| 2013/0346851 | A1* | 12/2013 | Leece ............... G06F 17/30905 715/235 |
| 2014/0129540 | A1 | 5/2014 | Riley et al. |
| 2014/0164350 | A1 | 6/2014 | Landa et al. |
| 2014/0195510 | A1* | 7/2014 | Jourdan ............ G06F 17/30864 707/710 |
| 2014/0280012 | A1 | 9/2014 | Feuerlein et al. |
| 2014/0297836 | A1* | 10/2014 | Cohen .................... H04L 67/22 709/224 |
| 2014/0330835 | A1* | 11/2014 | Boyer ............... G06F 17/30613 707/741 |
| 2015/0026201 | A1 | 1/2015 | Mukherjee et al. |
| 2015/0134685 | A1 | 5/2015 | Satishkumar |
| 2015/0135061 | A1* | 5/2015 | Palanichamy ...... G06F 17/2247 715/235 |
| 2016/0048602 | A1 | 2/2016 | Yastrebenetsky et al. |
| 2016/0132048 | A1 | 5/2016 | Kambe et al. |
| 2016/0188552 | A1* | 6/2016 | Wang .................... G06F 17/218 715/236 |
| 2016/0253679 | A1* | 9/2016 | Venkatraman ..... G06Q 30/0185 705/310 |
| 2016/0259717 | A1* | 9/2016 | Nychis ................... G06F 9/451 |
| 2017/0103058 | A1* | 4/2017 | Gandhi ................... G06N 5/02 |
| 2017/0255445 | A1* | 9/2017 | Seolas ................... G06F 3/0481 |
| 2017/0255475 | A1* | 9/2017 | Seolas ................... G06F 9/451 |
| 2018/0137351 | A1* | 5/2018 | Hopen ............... G06K 9/00449 |

FOREIGN PATENT DOCUMENTS

| | | |
|---|---|---|
| WO | 2017078705 | 5/2017 |
| WO | 2017136755 | 8/2017 |

OTHER PUBLICATIONS

Non-Final Office Action for U.S. Appl. No. 14/917,251 dated Oct. 3, 2018.
Non-Final Office Action for U.S. Appl. No. 15/502,864 dated Sep. 27, 2018.
International Search Report and Written Opinion for application No. PCT/US2017/016553 dated Jun. 5, 2017.
International Search Report and Written Opinion for application No. PCT/US2016/017194 dated Nov. 1, 2016.

* cited by examiner

AUTOMATIC EXECUTION OF OBJECTS IN A USER INTERFACE

CROSS-REFERENCE TO RELATED APPLICATIONS

The present invention is a 35 U.S.C. § 371 U.S. National Stage of PCT Application No. PCT/US15/59064, filed on Nov. 4, 2015. The entire content of the aforementioned patent application is incorporated herein by reference.

BACKGROUND OF THE INVENTION

1. The Field of the Invention

This invention relates to systems, methods, and computer program products related to automatic execution of objects in a user interface.

2. Background and Relevant Art

Mobile devices, such a tablet computers and smart phones, have experienced explosive growth and market penetration in recent years. Accompanying this growth, the mobile application market has also experienced tremendous growth. Mobile applications can range from simple games to complex productivity software. In many cases, regardless of the type of mobile application, the mobile application communicates through the Internet to various servers. The servers can be used to store user created content, provide additional features, allow a developer to track software and user behavior, or provide other similar services.

In some cases, mobile applications may act as a web portal to a webpage. Using the mobile application, a user may navigate the webpage's content. In some conventional systems, the mobile application may provide a user experience that is very similar to the user experience provided through a general purpose mobile web browser.

Similar to webpages that are accessed through conventional computer-based web browsers, the content viewable by the mobile application may comprise various pieces of code, sometimes referred to as "tags," that are configured to execute (i.e., "fire") when the content is viewed. In at least one conventional form, a tag is a hidden element within a webpage that causes some action to occur on a webpage when it is fired. In particular, in at least one implementation, a tag is a piece of code that a webpage owner can place within a webpage, and allows the webpage owner to track information about the visitors who download and execute the particular piece of code.

For example, a tag can comprise a transparent GIF or a tracking pixel, which is placed within the code of a webpage. The actual transparent GIF or tracking pixel can be stored on a separate server from the actual webpage. The tag is fired when the browser requests the transparent GIF or tracking pixel from the separate server. When the separate server receives the request from the browser, the server can gather various analytic data about the requestor.

Once executed, a tag can gather information such as where the visitor came from (e.g., what webpage or search engine), what keywords were used to find the webpage, whether a particular advertisement directed a visitor to the page, and other related data. In many situations, a webpage can comprise multiple tags from a variety of different parties. For example, a particular webpage may contain a Google Analytics tag, a Facebook tag, a page-counter Tag, a weather tag, and other common tags. In at least one implementation, a tag can merely comprise a particular call to an external advertising server.

As mobile applications have become more pervasive and as more users have begun to access web-based content through custom mobile applications, content providers have also become more interested in ensuring that the various tags embedded within their web content are operating correctly within the mobile applications. In many cases, large amounts of advertising money are dependent upon tags correctly tracking visitors to a website. Keeping proper track of these tags, however, presents several unique challenges.

For example, due to the tremendous variety of mobile applications it is much more difficult to create a "standard" test environment. Additionally, many organizations create a mobile version of their web content, such that audits of their conventional web-based content do not necessarily correlate to audits of their mobile content. Furthermore, many applications are encrypted or are otherwise run in a "black box" where their executions are not visible to outside parties. This makes tracking the firing of tags very difficult. Application structure, tags, actions and other data may each be obscured or hidden by such execution of an application Accordingly, determining which actions are available to be performed, and determining which actions have been performed by an application is quite problematic.

BRIEF SUMMARY

Embodiments described herein are directed to traversing and mapping a user interface. In one embodiment, a computer system performs a method for traversing and mapping a user interface that includes the following: rendering a user interface (UI) based on data received from an information source, constructing an element collection with UI elements, the element collection describing relationships that exist between the UI elements, traversing the element collection to identify various node element types, identifying, within a pre-defined action set, an action associated with at least one of the identified node element types, executing the identified action against the identified node element types, and logging at least one network request resulting from the executed action.

In another embodiment, a computer system is provided that includes the following: at least one hardware processor, a graphics renderer configured to render a user interface (UI) based on data received from an information source, an element collection constructing module configured to construct an element collection with various UI elements, where the element collection describes relationships that exist between the UI elements, an element collection traversing module configured to traverse the element collection to identify node element types, and an identifying module configured to identify, within a pre-defined action set, an action associated with at least one of the identified node element types. The processor executes the identified action against the identified node element types and a logging module of the computer system logs at least one network request resulting from the executed action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
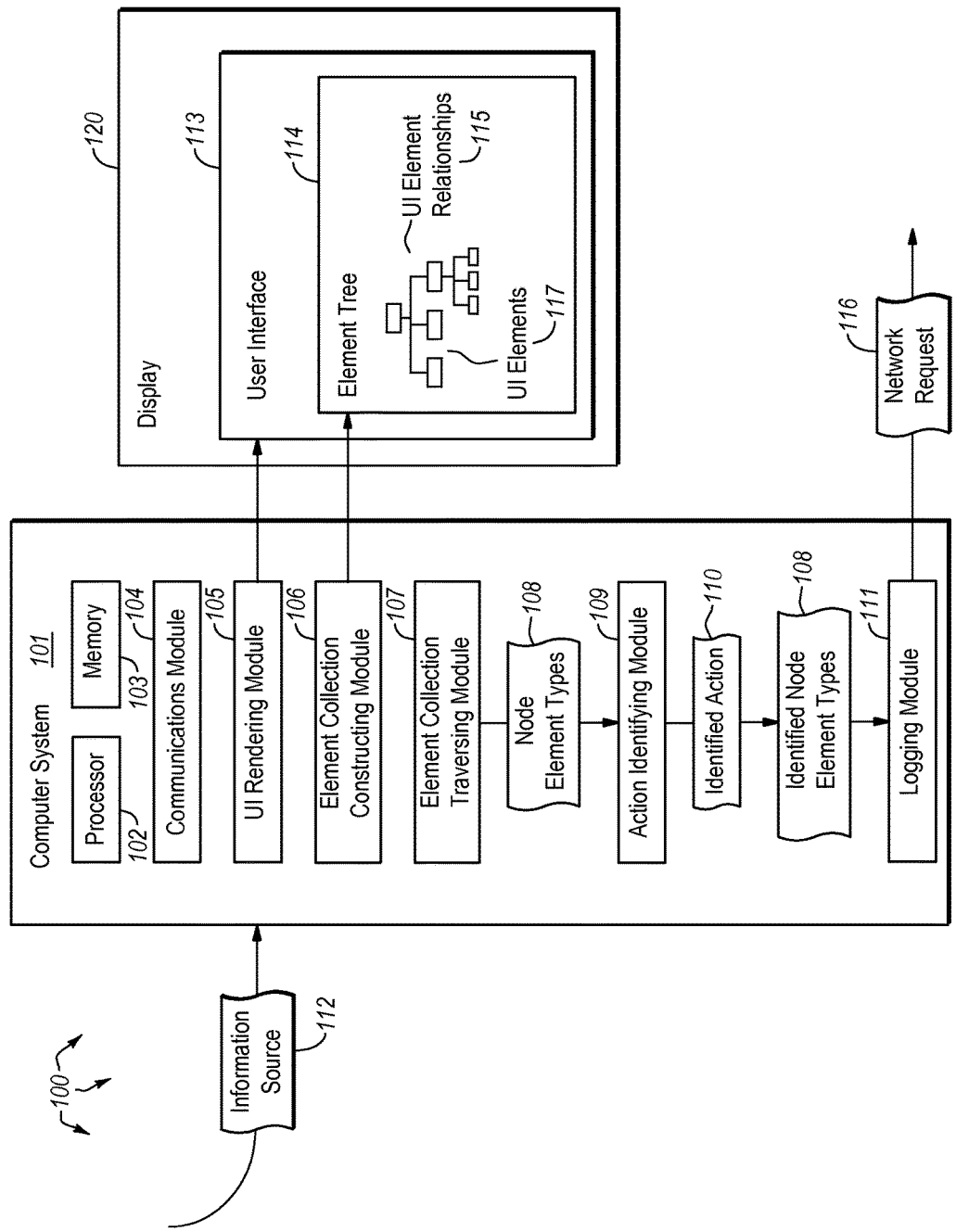
FIG. 1 illustrates a computer architecture in which embodiments described herein may operate including traversing and mapping a user interface.

Embodiments described herein are directed to traversing and mapping a user interface. In one embodiment, a computer system performs a method for traversing and mapping a user interface that includes the following: rendering a user interface (UI) based on data received from an information source, constructing an element collection with UI elements, the element collection describing relationships that exist between the UI elements, traversing the element collection to identify various node element types, identifying, within a pre-defined action set, an action associated with at least one of the identified node element types, executing the identified action against the identified node element types, and logging at least one network request resulting from the executed action.

In another embodiment, a computer system is provided that includes the following: at least one hardware processor, a graphics renderer configured to render a user interface (UI) based on data received from an information source, an element collection constructing modules configured to construct an element collection with various UI elements, where the element collection describes relationships that exist between the UI elements, an element collection traversing module configured to traverse the element collection to identify node element types, and an identifying module configured to identify, within a pre-defined action set, an action associated with at least one of the identified node element types. The processor executes the identified action against the identified node element types and a logging module of the computer system logs at least one network request resulting from the executed action.

Embodiments described herein may implement various types of computing systems. These computing systems are now increasingly taking a wide variety of forms. Computing systems may, for example, be mobile phones, electronic appliances, laptop computers, tablet computers, wearable devices, desktop computers, mainframes, gaming consoles, over-the-top (OTT) data streaming devices, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, methods, or similar computer-executable instructions that may be executed on the computing system. The different components, modules, engines, and services described herein may be implemented as objects or processes that execute on the computing system (e.g., as separate threads).

As described herein, a computing system may also contain communication channels that allow the computing system to communicate with other message processors over a wired or wireless network. Such communication channels may include hardware-based receivers, transmitters or transceivers, which are configured to receive data, transmit data or perform both.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g. character, double, floating-point), composite types (e.g. array, record, union, etc.), abstract data types (e.g. container, list, set, stack, tree, etc.), hashes, graphs or other any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, gaming consoles, OTT devices, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Referring to the figures, FIG. 1 illustrates a computer architecture 100 in which at least one embodiment described herein may be employed. The computer architecture 100 includes a computer system 101. The computer system 101 may be any type of local or distributed computer system, including a cloud computer system. The computer system 101 includes modules for performing a variety of different functions. For instance, the communications module 104 may be configured to communicate with other computer systems. The communications module 104 may include any wired or wireless communication means that can receive and/or transmit data to or from other computer systems. The communications module 104 may be configured to interact with databases, mobile computing devices (such as mobile phones or tablets), embedded or other types of computer systems.

In one embodiment, a computer system 101 is provided that includes at least one hardware processor 102 and hardware memory 103. The computer system 103 includes a graphics renderer 105 configured to render a user interface (UI) based on data received from an information source 112. The information source 112 may be stored locally on the computer system 101, or may be stored in a remote database such as the cloud. The information source 112 may be a web site, an application, a document object model (DOM), a document or other source of data. The UI rendering module 105 (or "graphics renderer 105" herein) may be configured to read and interpret the data of the information source 112, and present it in a user interface 113. This UI may be displayed in a PC display, a mobile phone display or some other type of display 120.

The computer system 101 also includes an element collection constructing module 106 that works in conjunction with the UI rendering module 105. The element collection constructing module 106 identifies UI elements in the information source 112 and constructs an element collection with the identified UI elements. For example, the element collection constructing module 106 may access information source 112 and identify UI elements 117. The UI elements 117 are then built into a collection of elements such as an element tree 114 based on their relationships 115 with each other. As such, the element collection can describe or illustrate the relationships 115 that exist between the UI elements.

In one embodiment, the element collection is an element tree 114. The element tree 114 may illustrate the UI elements and relationships between the elements in a root-and-branch manner. Although many embodiments will be described herein with the collection of UI elements depicted or described as an element tree, it will be understood that the collection of elements may take on substantially any organizational form, including container, list, set, stack, tree or other organizational form. If, for example, the selection of a UI element causes the appearance of a new UI element, or causes the UI element to change or transition to another element, the UI elements are said to be linked. The relationships may be hierarchical (as shown in element tree 114 of FIG. 1), or may be linked in some other manner.

The UI elements 117 themselves may be buttons, links, slider bars, pictures, videos, text boxes or other UI elements. Each UI element 117 may allow or provide a different type of interaction with a user. For instance, some UI elements are actionable, meaning that if selected, an action is performed, while other UI elements are not actionable, meaning that they cannot be selected or, if selected, no action is performed. The actions associated with the UI elements may also be represented in the relationships 115 between UI elements.

The computer system 101 further includes an element collection traversing module 107 that is configured to traverse the element tree 114 to identify node element types 108. As mentioned above, the UI element may include a variety of different types including buttons, sliders, pictures, videos, etc. Each UI element may be activated in a different manner. Accordingly, the action identifying module 109 may work in conjunction with the element collection traversing module 107 to identify, within a pre-defined action set, an action 110 associated with at least one of the identified node element types 108.

In this manner, the computer system 101 can determine which UI elements are present in the information source 112, how each of the UI elements is activated, and what happens when the UI elements are activated (e.g. does a new application screen appear, does a browser application navigate to a new web site or web page within a web site, etc.). Many different actions may occur, and the action identifying module 109 is configured to determine which actions will occur according to which inputs are provided. The inputs may include touch inputs such as tapping, tapping and holding, swiping up, down, right or left, pinching or performing other gestures. The inputs may also include hard button inputs (such as from physical buttons on a smart phone), mouse clicks, keyboard inputs, voice inputs, or other types of inputs.

Once the actions and node element types are identified, the hardware processor 102 of the computer system 101 executes the identified actions 110 against the identified tree node element types 108. The results of the execution are logged by the logging module 111 of the computer system. The logging module receives the inputs of the execution and logs at least one network request 116 resulting from the executed action. The network request 116 may be a data request or a request for a new web page, or a request for picture or video data, or some other type of network request.

Figure 2:
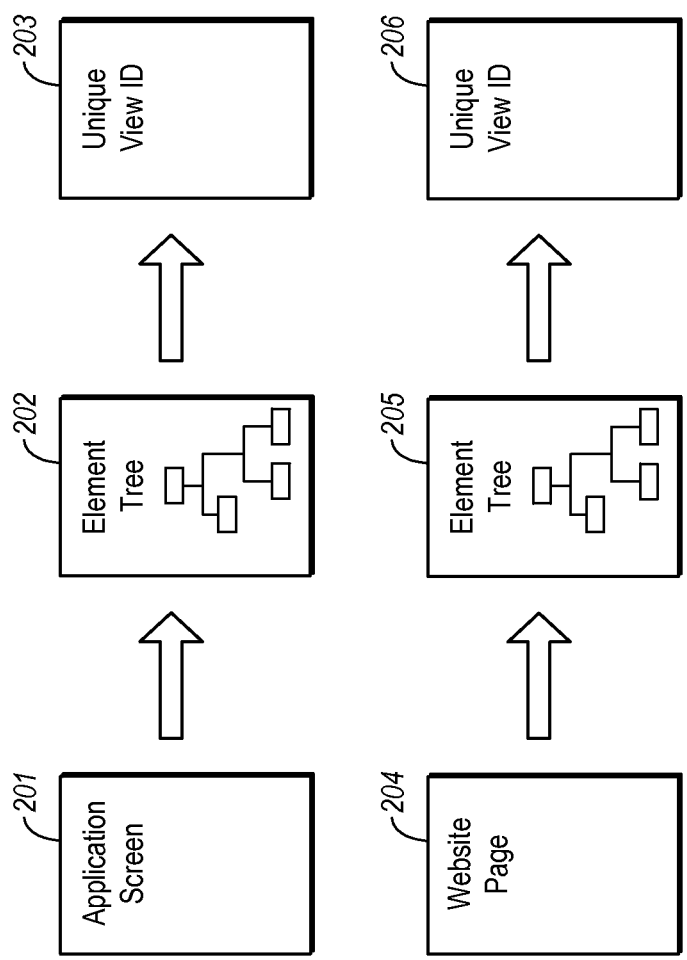
FIG. 2 illustrates an embodiment where information sources are mapped to element collections and are assigned unique view identifiers.

In some cases, the element collection constructing module 106 may construct an element tree or other collection of elements for each user interface view. A UI view may be an application screen, a web page at a web site, or some other view or representation of a user interface. As shown in FIG. 2, a UI view may be an application screen 201 or a web page 204. The application screen 201 may include various UI elements which are identified and mapped into an element tree 202. This element tree may be given a unique view identifier (ID) 203. The view ID 203 is specific to a given view such as to a specific application screen.

For example, when an application is initialized, it may begin on a landing screen or home screen. The home screen will be analyzed by computer system 101, the UI elements 117 will be identified and built into an element tree 114/202, and the home screen will receive a unique view identifier 203. If, for example, the home screen has three UI elements, each UI element may be selected individually to generate the next UI application screen. Thus, if the first button is selected, a new application screen may be generated, or at least some changes may be made to the home screen. The new application screen 201 (or modified home screen) may then be mapped into an element tree 202 and given a unique view ID 203. If new UI elements are presented in this new application screen, they too may be followed and mapped. Each new application screen will be analyzed for UI elements, mapped to an element collection, and assigned a unique view ID 203.

A similar process may be used for web pages. A web page 204 may be analyzed for UI elements such as links, buttons, pictures, videos, or other UI elements. The element collection constructing module 106 of computer system 101 may then generate an element tree 114/205 for that web page and may assign a unique view ID 206 to that web page. If one of the UI elements is selected, the computer system 101 may monitor changes to the web page or may perform the analysis on a new page and the process is repeated. Each new web page at the website gets an element tree 205 and a unique view ID 206. Thus, in this manner, a web site, application, DOM or other information source 112 may be analyzed for UI elements, represented in an element tree 114, and assigned a unique view ID.

The element tree organizes the UI elements 117 according to their relationships 115. Thus, if selection of one UI element leads to another page or screen, that page or screen will be directly related. In some cases, a single UI element may lead to different pages or screens (e.g. if the UI element can be selected in different manners such as touch or swipe). In other cases, multiple different UI elements may lead to the same page or screen. Thus, the element tree relationships 115 may be complex in nature for large websites or applications that have a great deal of content.

Figure 3:
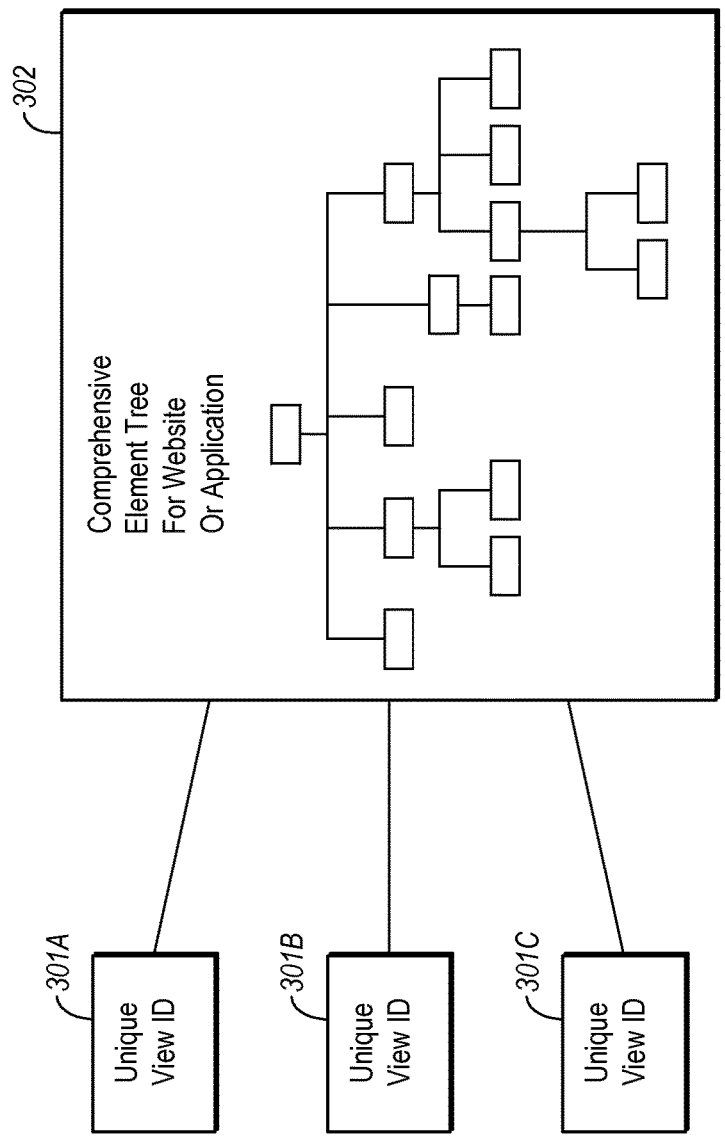
FIG. 3 illustrates an embodiment in which multiple unique view identifiers are combined into a comprehensive element collection for an information source.

As shown in FIG. 3, the unique view IDs (e.g. 301A-C) for multiple different application screens or web pages may be combined into a comprehensive element tree for a web site or application. The comprehensive element tree 302 may show the entire web site or application, or only portions thereof. For instance, in cases where the comprehensive element tree 302 is very large, a user may be able to drill down into the tree for greater detail. For instance, if unique view IDs 301A and 301B are initially visible when viewing the comprehensive element tree 302, unique view ID 301C may only become visible when the user drills down into lower layers of the tree. When drilling down, the comprehensive element tree 302 maintains the relationships to other unique view IDs, such that if the tree is scaled up or down, the relationships scale in proportion to the level of zoom.

Figure 4:
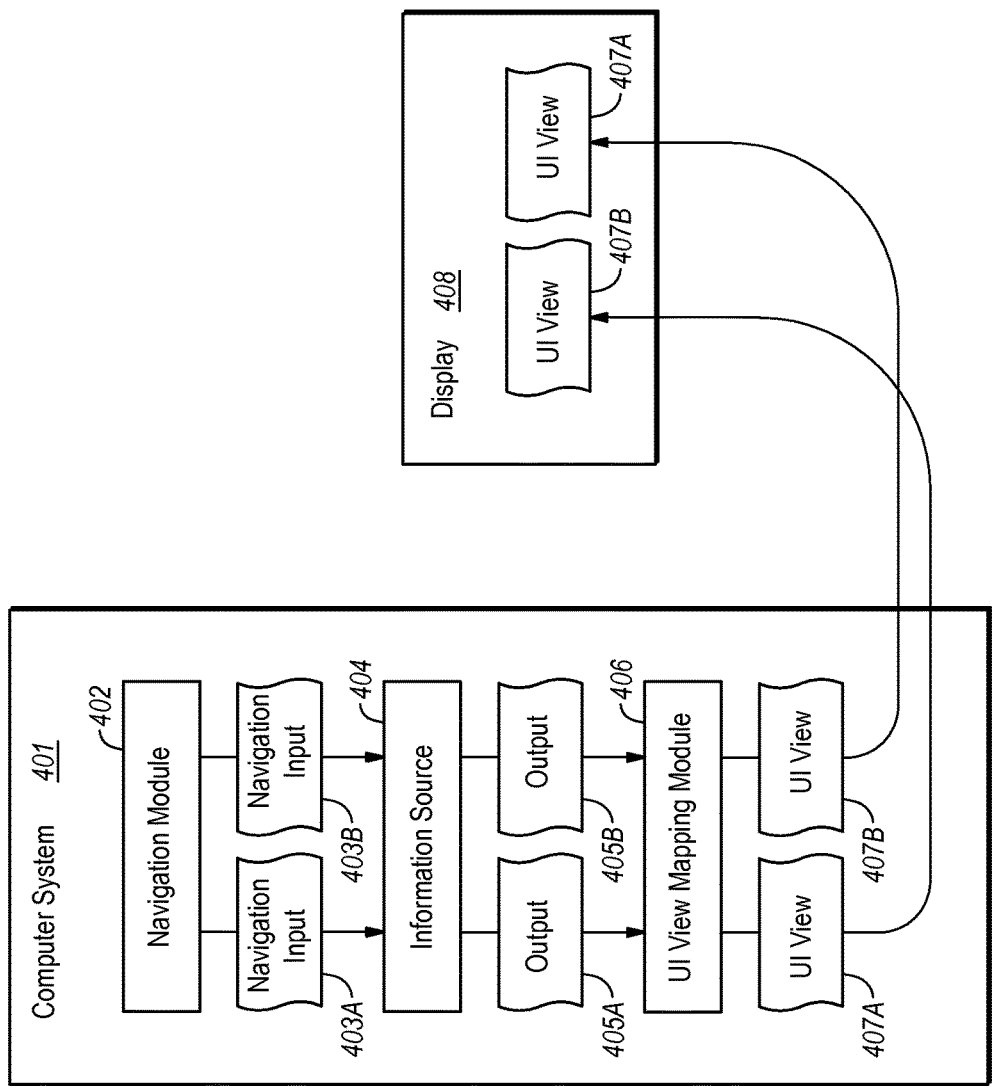
FIG. 4 illustrates an embodiment of a computer system in which navigation inputs are applied to an information source to generate user interface views.

In some embodiments, as shown in FIG. 4, the computer system 401 may be configured to provide navigation inputs to an information source in order to determine what results from the input. For instance, the navigation module 402 may provide navigation inputs 403A and/or 403B to the information source 404. Navigation input 403A may result in output 405A, while navigation input 403B may result in output 405B. The output will likely cause some change to the user interface. As such, the UI view mapping module 406 will generate a new UI view 407A/407B for each new application screen or web page view. These UI views 407A and 407B may be displayed in a display 408, such as if the UI views are part of the comprehensive element tree 302 of FIG. 3.

Thus, using the navigation inputs of FIG. 4, the computer system 401 (which may be the same as or different than computer system 101 of FIG. 1) may identify which UI elements are present in an information source, navigate through the UI elements by applying navigation inputs to those UI elements, and determine which UI elements are present in the newly generated application screen, web page or other information source. The newly generated information source may receive its own unique UI view ID (e.g. 203), and may be placed in a comprehensive element tree for the entire application or website (or group of applications or chain of related web sites). This comprehensive element tree 302 may thus provide a good indication of how an application or web page is structured, and which navigation inputs lead to which UI views.

Using this information, the computer system 101 may determine which actions (i.e. which navigation inputs) and/ or which UI elements fire tags. As used herein, a "tag" refers to an identifier or other data element associated with an advertisement or other feature of an application or web page. For example, a tag may be associated with a video on a web page. If that video is activated, then a tag associated with that video fires. The firing of the tag may send data to an advertiser or other entity indicating that the video has been activated. The same may be true for banner ads in an application. When selected, the banner ads may fire a tag, notifying the ad owner or provider that the advertisement was activated. Other elements may also trigger the firing of a tag, such as the selection of a picture, video, button, form completion box, or other UI element.

Content providers may wish to be made aware when such content is viewed. As such, tags may fire when the content is activated. An identifying module of computer system 101 may be configured to identify each action 110 that fires a tag. Then, for each action that fires a tag, the logging module 111 may save an indication of which action fires which tag. Accordingly, an automated process may learn, over time, by applying inputs to a given information source, which UI elements it contains, which actions activate those UI elements, which actions result in the firing of a tag, and which UI views are related to each other. These concepts will be explained further below with regard to method 500 of FIG. 5.

Figure 5:
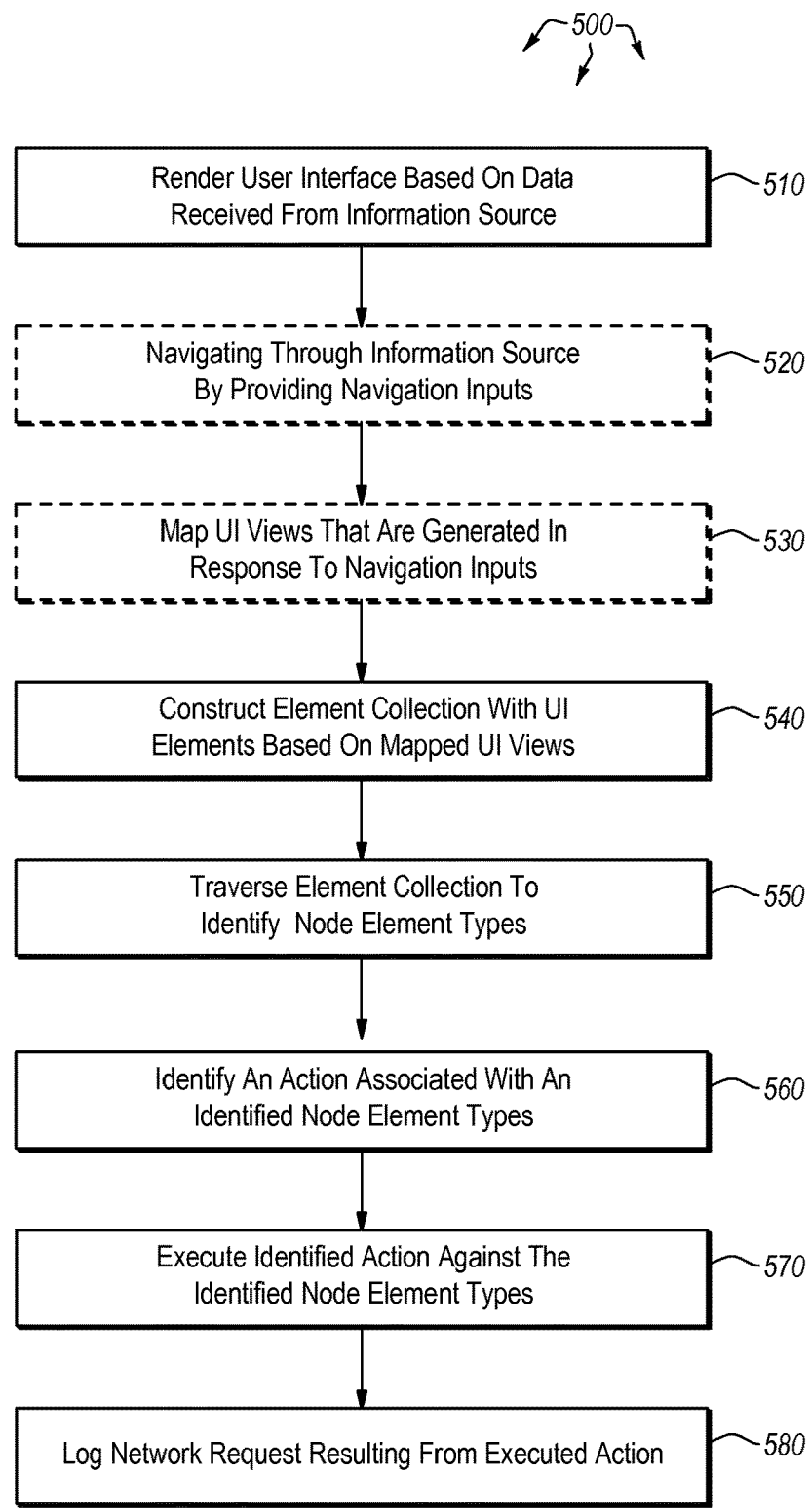
FIG. 5 illustrates a flowchart of an example method for traversing and mapping a user interface.

In view of the systems and architectures described above, methodologies that may be implemented in accordance with the disclosed subject matter will be better appreciated with reference to the flow chart of FIG. 5. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 5 illustrates a flowchart of a method 500 for traversing and mapping a user interface. The method 500 will now be described with frequent reference to the components and data of environment 100 of FIG. 1.

Method 500 includes rendering a user interface (UI) based on data received from an information source (510). For example, UI rendering module 105 may render user interface 113 in display 120. The UI is rendered based on information accessed in information source 112. The information source may be accessed from a database, whether remote or local, or from some other data store. The information source 112 may be received or accessed as a single data structure, or as a stream of data structures. The information source may be a single application or web page, or may be a group of applications, web pages, document object models, operating system views or other information sources.

Optionally, method 500 may include navigating through the information source by providing a plurality of navigation inputs to the information source (520). The navigation module 402 of computer system 401 may provide navigation inputs 203A, 203B and any number of subsequent inputs to the information source 404. The navigation inputs (e.g. touch, mouse, or keyboard or voice inputs) are applied to a specific UI element and typically result in some change to the UI view. If changes to the UI view (e.g. 407A/407B) occur, the UI view is assigned a unique view ID. Each UI view may then be mapped to an element tree according to its relationship with other UI views (530).

Method 500 next includes constructing an element collection with one or more UI elements based on the mapped UI views, the element collection describing relationships that exist between the UI elements (540). The element collection constructing module 106 constructs element tree 114 or other collection of elements according to the mapped UI views. The element tree 114 may be in a hierarchical layout, as shown in FIG. 1, but may also be organized in other forms, such as a modular or functional layout. Each UI element may have an associated action 110 that, when activated, leads to a new UI view. As such, the UI views and elements of the element tree 114 may be related. The element tree 114 shows those relationship 115. In some cases, the element tree may color code or label each relationship according to its relationship type.

Method 500 further includes traversing the element collection to identify one or more node element types 108 (550) and identifying, within a pre-defined action set, an action 110 associated with at least one of the identified node element types (560). The action may include launching a video, viewing an image, generating a new UI view or menu, generating new text, following a link to a new web page, launching an application, or performing some other type of functionality related to a UI element. The processor 102 of the computer system 101 may then execute the identified action against the identified node element types (570) and log network requests 116 resulting from the executed action (580). The network requests 116 may include requests for new web pages, requests for data for an application (i.e. a new view of an application), requests for data related to an advertisement or other requests for data.

In some cases, as mentioned above, the network request 116 is an indication that a user has selected an advertisement, whether that be a video, a picture, a banner ad, a flash ad or some other type of advertisement. In those cases, a tag is said to have fired. When tags for advertisements fire, the companies providing the ads or paying for the ads typically like to know about such a firing. Accordingly, the computer system 101 can analyze UI elements and their associated actions, and determine which UI elements are advertisements by determining when certain advertisement-related tags fire. Thus, even in cases where application data or website data is encrypted or otherwise obscured, the computer system 101 may be able to determine that a certain network request 116 has gone out as the result of a given action 110. If that network request is related to an advertisement, the computer system 101 may determine that a certain action on a certain UI view results in the firing of that tag. This information can be logged in a database, and any subsequent firings of that tag can also be logged.

As shown in FIG. 2, a unique view ID (e.g. 203 or 206) may be generated for each constructed element tree (e.g. 202 or 205). The unique view ID may thus be created for each screen of an application, each page of a web site, each operating system view or other UI view. The unique view IDs from the application screens or web pages may be combined into a comprehensive element tree (e.g. 302 of FIG. 3) for the respective application screens or pages of the website. The comprehensive element tree 302 may show a portion or all of the UI views for a website or application. The comprehensive element tree 302 may be interactive, and may allow a user to select a given view and show an image or rendering of that UI view.

In some embodiments, one or more of the modules and components of FIGS. 1 and 4 may be provided in an emulator. For example, the UI 113 may be rendered in an emulator with all of its UI elements. The emulator may include navigation functionality provided in FIG. 4 (e.g. navigation module 402) to navigate through the information source 112 by applying a plurality of navigation inputs to the information source. The emulator may then map the UI views that are generated in response to the navigation inputs, and construct the element tree with the UI elements based on the mapped UI views. The emulator thus constructs an element tree 114 for each UI view. Multiple element trees or other element collections may be linked together in the comprehensive view. Each UI view has its own unique ID which, in some cases, is the name of the element tree. The element tree may include any number of different types of UI elements.

In some embodiments, the computer system 101 or the emulator may determine that a specific UI view is statistically identical to a second, different UI view. In such cases, the same view ID may be assigned to both the specified UI view and the second, different UI view. Accordingly, for example, if activation of a UI element made a change to the UI view, but the change was so minor that the two UI views were substantially the same, the same UI view ID may be assigned to both UI views. Still further in some cases, when constructing an element tree with UI elements, the computer system 101 may look at source code (if available) to help determine what each UI element is.

For instance, web pages include layout code that may indicate what a UI element is and, potentially, what it does. Block UI elements, for example, in the UI may be identified by accessing screen instructions for the UI. In this manner, screen instructions, layout code or any other clues may be used to identify UI elements and their corresponding actions. However, at least in some cases, such as with mobile applications, the operating code of the application may be encrypted or obscured so that such an analysis is difficult or not possible. The code analysis may also be used when constructing the element trees. Various indicators in the application code or web page layout code may be used to identify UI elements and their relationships to other UI elements. The indicators in the code may also be used to identify advertisements, and further determine when tags associated with an advertisement have fired.

Accordingly, methods, systems and computer program products are provided which traverse and map user interfaces. The methods, systems and computer program products can identify UI elements and their relationships, assign identifiers to UI views, and determine when tags have fired as a result of a UI element being activated.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A method, implemented at a computer system that includes at least one processor, for traversing and mapping a user interface, the method comprising:
   rendering a user interface (UI) based on data received from an information source;
   navigating, with a navigation module within the computer system, through the UI by providing a plurality of navigation inputs from the navigation module to the UI;
   when changes occur to the UI based upon an input from the plurality of navigation inputs, assign a unique view ID to the UI view;
   creating an element collection with one or more UI elements, the element collection describing relationships that exist between the one or more UI elements within the user interface;
   creating a unique view ID for each created element collection, wherein a unique view ID is created for each screen of an application or each page of a web site;
   automatically traversing, with the computer system, the element collection to identify one or more node element types;
   automatically identifying with the computer, within a pre-defined action set, an action associated with at least one of the identified one or more node element types, wherein the action comprises a response by the one or more UI elements based upon an input to the one or more UI elements;
   automatically executing, with the computer, the identified action against the identified one or more node element types;
   identifying at least one network request being sent in response to automatically executing the identified action, wherein the network request is sent by a firing tag; and
   logging the at least one network request resulting from the executed action.

2. The method of claim 1, wherein the information source comprises at least one of a software application or a web page.

3. The method of claim 1, wherein the unique view IDs from the application screens or web pages are combined into a comprehensive element tree for multiple application screens or multiple pages of the website.

4. The method of claim 1, wherein the user interface for the information source is rendered in an emulator or in a physical device.

5. The method of claim 1, wherein an element tree is constructed for each UI view, and wherein a plurality of constructed element trees are linked together.

6. The method of claim 5, wherein each UI view is assigned a unique ID, and wherein the unique ID comprises the name of the tree.

7. The method of claim 1, wherein the element collection is constructed with multiple different types of UI elements.

8. A method, implemented at a computer system that includes at least one processor, for traversing and mapping a user interface, the method comprising:
   rendering a user interface (UI) based on data received from an information source;
   navigating through the information source by providing a plurality of navigation inputs to the information source;
   mapping one or more UI views that are generated in response to the plurality of navigation inputs and assigning unique view IDs to each UI view within the one or more UI views, wherein a unique view ID is created for each screen of an application or each page of a web site;
   constructing an element collection with one or more UI elements based on the mapped one or more UI views, the element collection describing relationships that exist between the one or more UI elements;
   automatically traversing, with the computer system, the element collection to identify one or more node element types;
   automatically identifying with the computer system, within a pre-defined action set, an action associated with at least one of the identified one or more node element types, wherein the action comprises a response by the one or more UI elements based upon an input to the one or more UI elements;
   automatically executing, with the computer, the identified action against the identified one or more node element types;
   identifying at least one network request being sent in response to automatically executing the identified action, wherein the network request is sent by a firing tag; and
   logging the at least one network request resulting from the executed action.

9. The method of claim 8, wherein block UI elements for the user interface are identified by accessing screen instructions for the UI.

10. The method of claim 8, wherein the navigation inputs comprise at least one of screen taps, screen swipes, text entry, mouse clicks, cursor movements or touch gestures.

11. The method of claim 8, further comprising:
   determining that a specified UI view is substantially identical to a second, different UI view; and
   assigning the same view ID to the specified UI view and the second, different UI view.

12. The method of claim 8, wherein constructing an element collection with one or more UI elements further comprises analyzing source code for the information source.

13. The method of claim 8, further comprising:
   identifying each action that fires a tag; and
   for each action that fires a tag, saving an indication of which action fires which tag.

14. A computer system for traversing and mapping a user interface, comprising:
   one or more processors; and
   one or more computer-readable media having stored thereon executable instructions that when executed by the one or more processors configure the computer system to perform at least the following:
      rendering a user interface (UI) based on data received from an information source;
      navigating, with a navigation module within the computer system, through the UI by providing a plurality of navigation inputs from the navigation module to the UI;
      when changes occur to the UI based upon an input from the plurality of navigation inputs, assign a unique view ID to the UI view;
      creating an element collection with one or more UI elements, the element collection describing relationships that exist between the one or more UI elements within the user interface;
      creating a unique view ID for each created element collection, wherein a unique view ID is created for each screen of an application or each page of a web site;
      automatically traversing, with the computer system, the element collection to identify one or more node element types;
      automatically identifying with the computer, within a pre-defined action set, an action associated with at least one of the identified one or more node element types, wherein the action comprises a response by the one or more UI elements based upon an input to the one or more UI elements;
      automatically executing, with the computer, the identified action against the identified one or more node element types;
      identifying at least one network request being sent in response to automatically executing the identified action, wherein the network request is sent by a firing tag; and
      logging the at least one network request resulting from the executed action.

15. The system of claim 14, wherein an element tree is constructed for each UI view, and wherein a plurality of constructed element trees are linked together.

16. The system of claim 15, wherein each UI view is assigned a unique ID, and wherein the unique ID comprises the name of the tree.

17. The method of claim 14, wherein the element collection is constructed with multiple different types of UI elements.

* * * * *